United States Patent
Huang et al.

(10) Patent No.: US 11,323,299 B2
(45) Date of Patent: May 3, 2022

(54) COMMUNICATION SIGNAL DEMODULATION APPARATUS AND COMMUNICATION SIGNAL DEMODULATION METHOD

(71) Applicant: Richtek Technology Corporation, Zhubei (TW)

(72) Inventors: Hung-Chi Huang, Taoyuan (TW); Fu-Chi Lin, Hsinchu (TW); Tsung-Nan Wu, Hsinchu (TW); Mei-Shu Wang, Hsinchu (TW)

(73) Assignee: RICHTEK TECHNOLOGY CORPORATION, Zhubei (TW)

( * ) Notice: Subject to any disclaimer, the term of this patent is extended or adjusted under 35 U.S.C. 154(b) by 0 days.

(21) Appl. No.: 17/337,351

(22) Filed: Jun. 2, 2021

(65) Prior Publication Data
US 2022/0045888 A1 Feb. 10, 2022

(30) Foreign Application Priority Data
Aug. 4, 2020 (TW) ................................. 109126305

(51) Int. Cl.
*H04L 27/06* (2006.01)
*H04L 27/156* (2006.01)
*H04L 1/00* (2006.01)

(52) U.S. Cl.
CPC .......... *H04L 27/156* (2013.01); *H04L 1/0063* (2013.01)

(58) Field of Classification Search
CPC ............................ H04L 27/156; H04L 1/0063
USPC .......................................................... 375/340
See application file for complete search history.

(56) References Cited

U.S. PATENT DOCUMENTS

| | | | | |
|---|---|---|---|---|
| 5,640,429 A * | 6/1997 | Michels | ................... | G01S 7/292 342/378 |
| 5,711,497 A * | 1/1998 | Andrianos | .............. | B61L 3/221 246/167 R |
| 6,091,361 A * | 7/2000 | Davis | ........................ | G01S 7/36 342/195 |
| 7,289,570 B2 * | 10/2007 | Schmidl | ............... | H04B 7/0615 375/267 |
| 7,555,064 B2 * | 6/2009 | Beadle | .................. | H04L 1/0003 375/316 |

(Continued)

*Primary Examiner* — Tanmay K Shah
(74) *Attorney, Agent, or Firm* — Tung & Associates

(57) ABSTRACT

A communication signal demodulation apparatus demodulates a communication signal to generate an output signal. The communication signal demodulation apparatus includes: plural sensor circuits which sense different electrical characteristics of one same communication signal and generate corresponding sensing modulation signals respectively; plural processing filters which filter the corresponding sensing modulation signals respectively and generate corresponding filtered modulation signals respectively; plural demodulators which demodulate the plural filtered modulation signals and generate corresponding demodulation signals respectively, wherein each of the filtered modulation signals corresponds to at least one of the demodulators; and a determination circuit which receive the plural demodulation signals, determine whether each unit signal of each of the demodulation signals is correct or not according to a determination mechanism, and combine one or more correct unit signals to generate the output signal.

14 Claims, 4 Drawing Sheets

(56) References Cited

U.S. PATENT DOCUMENTS

2009/0046809 A1* 2/2009 Meltzer .................. H04L 27/06
  375/308

* cited by examiner

Sft1

Spw2

COMMUNICATION SIGNAL DEMODULATION APPARATUS AND COMMUNICATION SIGNAL DEMODULATION METHOD

CROSS REFERENCE

The present invention claims priority to TW 109126305 filed on Aug. 4, 2020.

BACKGROUND OF THE INVENTION

Field of Invention

The present invention relates to a communication signal demodulation apparatus, and particularly to a communication signal demodulation apparatus which can enhance the speed in demodulating communication signals. The present invention also relates to a communication signal demodulation method.

Description of Related Art

A conventional communication signal demodulation apparatus demodulates received communication signals to obtain the transmitted data. Generally, the conventional communication signal demodulation apparatus performs correction check on the demodulated data to ensure that the data are received correctly. If the correction check fails, i.e., if the conventional communication signal demodulation apparatus finds out that the demodulated data are incorrect by the correction check, the conventional communication signal demodulation apparatus will try to demodulate the received communication signals again from the beginning, and the demodulation steps are performed repeatedly till the demodulated data pass the correction check.

The disadvantage of such conventional technique is that it will consume time to demodulate communication signals repeatedly because of failing the correction check.

For instance, in a wireless charging application, when the communication signals are transmitted between the charging dock and the device to be charged, if the correction check of the demodulated communication signals fails, an initiation process needs to be reactivated, so that the device starts to emitting the communication signals again. This consume time.

In view of the above, to overcome the drawbacks in the prior art, the present invention proposes a communication signal demodulation apparatus and a communication signal demodulation method to enhance the efficiency in demodulating the communication signals.

SUMMARY OF THE INVENTION

From one perspective, the present invention provides a communication signal demodulation apparatus for demodulating a communication signal to generate an output signal, the communication signal demodulation apparatus includes: a plurality of sensor circuits, which are configured to operably sense different electrical characteristics of one same communication signal and generate corresponding sensing modulation signals respectively; a plurality of processing filters, which are configured to operably filter the corresponding sensing modulation signals respectively and generate corresponding filtered modulation signals respectively; a plurality of demodulators, which are configured to operably demodulate the plural filtered modulation signals and generate corresponding demodulation signals respectively, wherein each of the filtered modulation signals corresponds to at least one of the demodulators, and each of the demodulation signals includes one or more unit signals; and a determination circuit, which is configured to operably receive the plural demodulation signals, and determine whether each unit signal of each of the demodulation signals is correct or not according to a determination mechanism, and combine one or more correct unit signals to generate the output signal.

From another perspective, the present invention provides a communication signal demodulation method for demodulating a communication signal to generate an output signal, the communication signal demodulation method including: sensing different electrical characteristics of one same communication signal and generating corresponding sensing modulation signals respectively by a plurality of sensor circuits; filtering the plural sensing modulation signals respectively and generating corresponding filtered modulation signals respectively; demodulating the filtered modulation signals by one or more demodulation processes to generate corresponding demodulation signals, wherein each of the filtered modulation signals corresponds to at least one of the demodulation processes, and each of the demodulation signals includes one or more unit signals; and receiving the demodulation signals, and determining whether each unit signal of each of the demodulation signals is correct or not according to a determination mechanism, and combining one or more correct unit signals to generate the output signal.

In one preferred embodiment, the unit signal includes a packet or a byte.

In one preferred embodiment, the communication signal is transmitted to the communication signal demodulation apparatus via a wireless communication transmission method.

In one preferred embodiment, the plural demodulators demodulate the plural filtered modulation signals by different demodulation processes, respectively.

In one preferred embodiment, the demodulation processes employed by the demodulators to demodulate the filtered modulation signals include: calculating pulse widths between two neighboring level changes of the filtered modulation signals by edge detection; and demodulating the filtered modulation signals according to the pulse widths between the neighboring level changes of the filtered modulation signals and a logic level of each pulse width.

In one preferred embodiment, the demodulation processes employed by the demodulators to demodulate the filtered modulation signals include: calculating pulse widths between two neighboring level changes of the filtered modulation signals by a clock signal; and demodulating the filtered modulation signals according to the pulse widths between the neighboring level changes of the filtered modulation signals and a logic level of each pulse width.

In one preferred embodiment, the determination mechanism includes a checksum step and/or a parity check step.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1A:
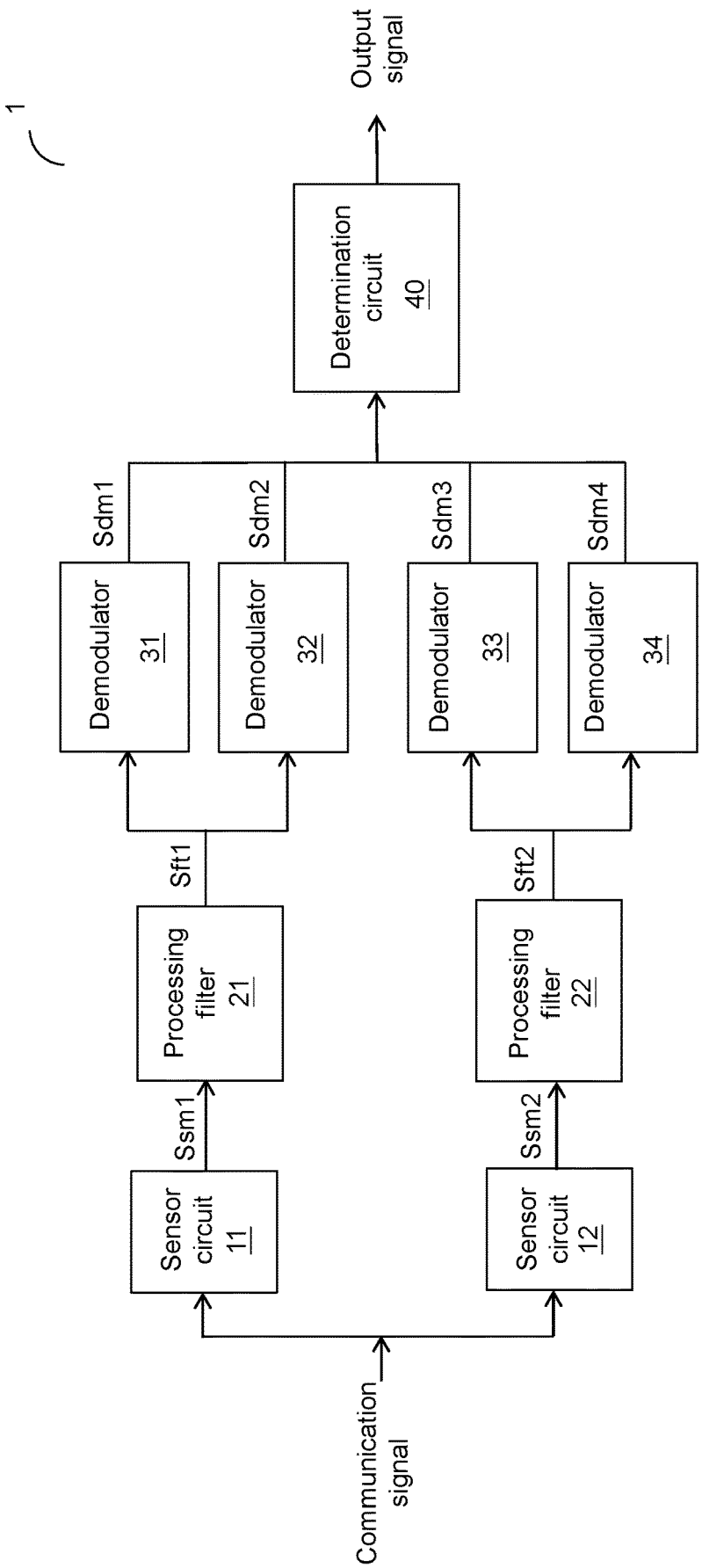
FIGS. 1A and 1B show schematic diagrams in accordance with one embodiment of a communication signal demodulation apparatus of the present invention.
Figure 1B:
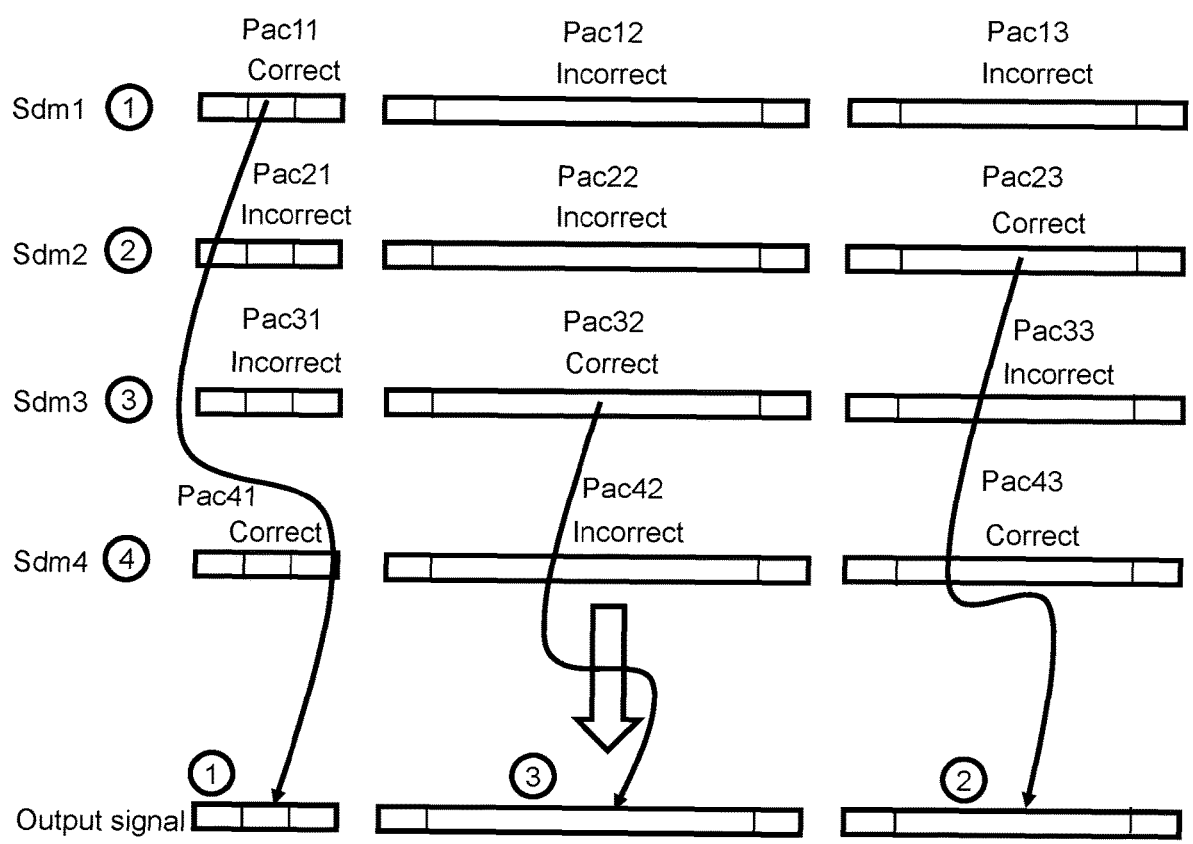

FIGS. 1A and 1B show schematic diagrams in accordance with one embodiment of a communication signal demodulation apparatus of the present invention. FIG. 1A illustrates one embodiment (communication signal demodulation apparatus 1) of the communication signal demodulation apparatus in accordance with the present invention. The communication signal demodulation apparatus 1 includes sensor circuits 11 and 12, processing filters 21 and 22, demodulators 31, 32, 33 and 34 and a determination circuit 40.

As shown in FIG. 1A, the communication signal demodulation apparatus 1 is employed for demodulating a communication signal to generate an output signal. In one preferred embodiment, the communication signal is transmitted to the communication signal demodulation apparatus 1 by wireless transmission. For example, in the wireless charging application of a mobile phone, the communication signal is transmitted between a charging dock and the mobile phone through wireless transmission.

Still referring to FIG. 1A, the sensor circuits 11 and 12 are configured to operably sense different electrical characteristics of one same communication signal and generate corresponding sensing modulation signals Ssm1 and Ssm2 respectively. For instance, the sensor circuit 11 is for example but not limited to a voltage sensing circuit for sensing a voltage of the communication signal, so as to generate a voltage sensing signal, i.e. the sensing modulation signal Ssm1; and the sensor circuit 12 is for example but not limited to a current sensing circuit for sensing a current of the communication signal, so as to generate a current sensing signal, i.e. the sensing modulation signal Ssm2.

Figure 2A:
FIG. 2A shows a schematic diagram of waveforms of different sensing modulation signals generated by sensing different electrical characteristics of one same communication signal in accordance with the present invention.
Figure 2B:
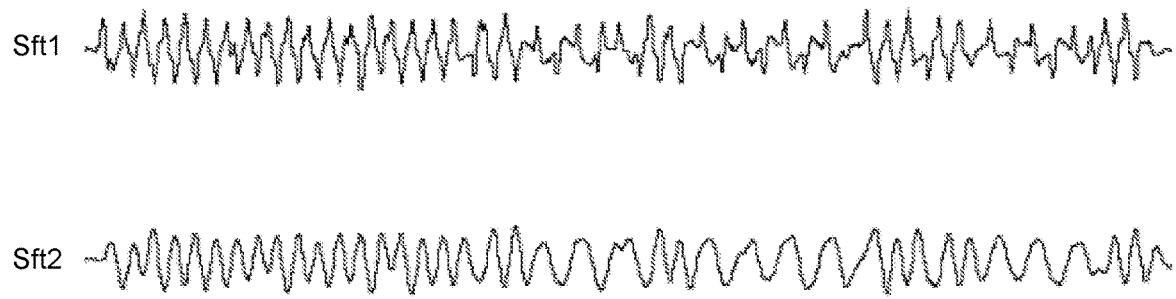
FIG. 2B illustrates a schematic diagram of waveforms of different filtered modulation signals in according with the present invention.

Still referring to FIG. 1A, the processing filters 21 and are configured to operably filter corresponding sensing modulation signals Ssm1 and Ssm2 respectively and generate corresponding filtered modulation signals Sft1 and Sft2 respectively. Please also refer to FIGS. 2A and 2B, wherein FIG. 2A illustrates a schematic diagram of waveforms of different sensing modulation signals generated by sensing different electrical characteristics of one same communication signal in accordance with the present invention, and FIG. 2B illustrates a schematic diagram of waveforms of different filtered modulation signals in according with the present invention. As shown in FIGS. 2A and 2B, the sensing modulation signals Ssm1 and Ssm2 with higher noise are converted into the filtered modulation signals Sft1 and Sft2 with lower noise by the processing filters 21 and 22, for higher accuracy and better processing in the subsequent demodulation process.

Still referring to FIG. 1A, the demodulators 31, 32, 33 and are configured to operably demodulate filtered modulation signals Sft1 and Sft2 and generate corresponding demodulation signals Sdm1, Sdm2, Sdm3 and Sdm4 respectively, wherein each of the filtered modulation signals Sft1 and Sft2 corresponds to at least one of the demodulators 31, 32, 33 and 34. In the example shown in the figure, the filtered modulation signal Sft1 for example corresponds to the demodulators 31 and 32; the filtered modulation signal Sft2 for example corresponds to the demodulators 33 and 34. The demodulators 31, 32, 33 and 34 can employ identical or different demodulation processes to respectively demodulate filtered modulation signals Sft1 and Sft2 to generate corresponding demodulation signals Sdm1, Sdm2, Sdm3 and Sdm4 respectively.

Still referring to FIG. 1A, the determination circuit 40 receives the demodulation signals Sdm1, Sdm2, Sdm3 and Sdm4. each of the demodulation signals includes one or more unit signals. The determination circuit 40 determines whether each unit signal of each of the demodulation signals Sdm1, Sdm2, Sdm3 and Sdm4 is correct or not according to a determination mechanism, and combines one or more unit signals to generate the output signal. Please also refer to FIG. 1B. In one embodiment, a unit signal is a packet, and the demodulation signal Sdm1 has a Pac11, Pac12 and Pac13; the demodulation signal Sdm2 has a Pac21, Pac22 and Pac23; the demodulation signal Sdm3 has a Pac31, Pac32 and Pac33; the demodulation signal Sdm4 has a Pac41, Pac42 and Pac43. As shown in FIG. 1B, the determination circuit 40 determines whether each of the aforementioned packets is correct or not according to the determination mechanism and combines the correct packets to form the output signal according to the determination result. Thus, the drawbacks of the prior art can be avoided; it is not necessary to repeatedly receive and demodulate the communication signal. The time for repeated signal transmission and demodulation can be saved to enhance the communication efficiency.

That the unit signal is a packet is just an example. The unit signal is not limited to a packet and can instead be for example a byte. The determination circuit 40 is not limited to determining the correction of each packet; instead, the determination circuit 40 can employ the same determination mechanism to determine whether each byte is correct or not and combine the correct bytes to form the correct packet or to directly form an output signal. All such modifications belong to the scope of the present invention.

Note that the determination mechanism mentioned herein can be embodied in various ways, which all fall within the spirit of the present invention. For example, the determination mechanism may include a checksum step and/or a parity check step. Checksum and parity check are well-known to a person having ordinary skill in the art, so they are not redundantly explained herein.

Figure 3A:
FIGS. 3A and 3B show schematic diagrams of waveforms of associated signals in accordance with one demodulation process of the present invention.
Figure 3B:
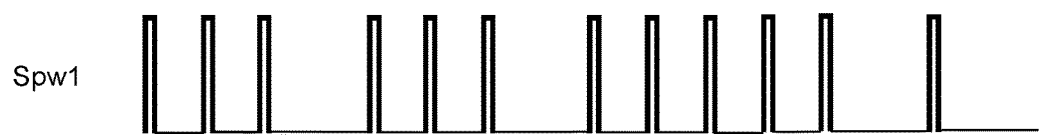

Please refer to FIGS. 3A and 3B, which illustrate schematic diagrams of waveforms of associated signals in accordance with one demodulation process of the present invention. FIG. 3A illustrates a schematic diagram of a waveform of the filtered modulation signal Sft1. As shown in FIG. 3A, the demodulator 31 triggers plural pulses as shown in FIG. 3B, for example by edge detection, to generate a pulse wave signal Spw1. That is, when the filtered modulation signal Sft1 has a level change, i.e. when a rising edge or a falling edge occurs, a pulse is generated. Next, the demodulator 31 calculates the pulse widths between two neighboring level changes of the filtered modulation signal Sft1 according to the pulse wave signal Spw1, and the demodulator 31 demodulates the filtered modulation signal Sft1 according to the pulse widths between the neighboring level changes of the filtered modulation signal Sft1 and a logic level of each pulse width.

Figure 5:
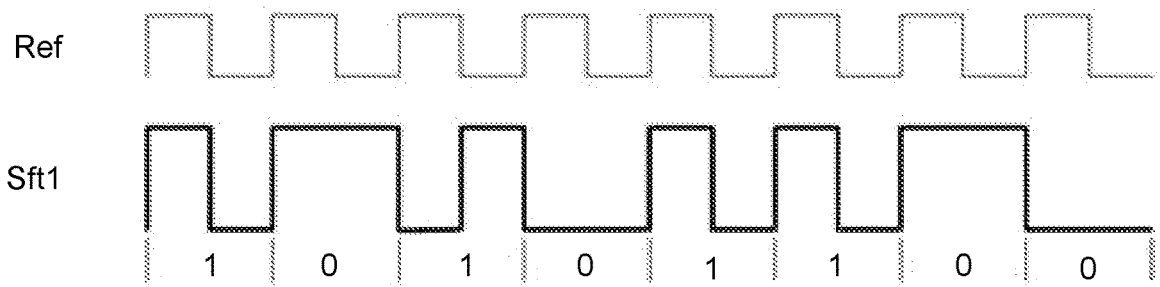
FIG. 5 shows a schematic diagram illustrating a step of demodulation and conversion in accordance with the present invention.

Please refer to FIG. 5, which shows a schematic diagram illustrating a step of demodulation and conversion in accordance with the present invention. As shown in FIG. 5, a bi-phase demodulation and conversion step compares the logic level of each pulse width of the filtered modulation signal Sft1 with a reference signal Ref. For instance, in a cycle composed of a high-level and a low-level of the reference signal Ref, if the filtered modulation signal Sft1 has a high level and a low level, it denotes logic "1", while if the filtered modulation signal Sft1 only has one level, either high level or low level, it denotes logic "0". In this embodiment, the filtered modulation signal Sft1 is demodulated accordingly.

Figure 4A:
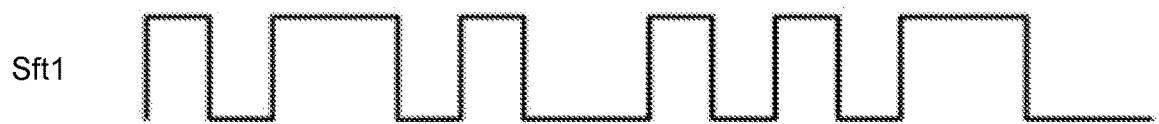
FIGS. 4A and 4B show schematic diagrams of waveforms of associated signals in accordance with another demodulation process of the present invention.
Figure 4B:

Please refer to FIGS. 4A and 4B, which show schematic diagrams of waveforms of associated signals in accordance with another demodulation process of the present invention. FIG. 4A illustrates a schematic diagram of a waveform of the filtered modulation signal Sft1. As shown in FIG. 4A, the demodulator 32 counts the time during which the filtered modulation signal Sft1 maintains at the high level by for instance a clock signal, so as to calculate the pulse widths between two neighboring level changes to generate a pulse wave signal Spw2. Next, the demodulator 32 calculates the pulse widths between two neighboring level changes of the filtered modulation signal Sft1 according to the pulse wave signal Spw2, and the demodulator 32 demodulates the filtered modulation signal Sft1 according to the pulse widths between two neighboring level changes of the filtered modulation signal Sft1 and the logic level of each pulse width. Next, the filtered modulation signal Sft1 for example can be demodulated by employing the demodulation and conversion step as shown in FIG. 5 in accordance with the present invention.

The determination circuit 40 determines whether each unit signal of each demodulation signal is correct or not according to a determination mechanism and combines one or more unit signals to generate an output signal. For example, the determination mechanism may include a checksum step and/or a parity check step. Checksum and parity check are well-known to a person having ordinary skill in the art, so they are not redundantly explained herein.

According to the present invention, the same communication signal is demodulated by plural sensor circuits and the plural demodulators at the same time, and the output signal is generated after the determination circuit determines whether or not each unit signal of the communication signal is correct and combines the separate pieces into one or plural correct unit signals. Advantages of the present invention over the prior art include that: the correction of the demodulation result can be ensured; repeated re-transmission of a large amount of communication signals is avoided; the time for demodulating communication signal again from the beginning is saved; thus, the communication efficiency is improved.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A communication signal demodulation apparatus for demodulating a communication signal to generate an output signal, the communication signal demodulation apparatus comprising:
   a plurality of sensor circuits, which are configured to operably sense different electrical characteristics of one same communication signal and generate corresponding sensing modulation signals respectively;
   a plurality of processing filters, which are configured to operably filter the corresponding sensing modulation signals respectively and generate corresponding filtered modulation signals respectively;
   a plurality of demodulators, which are configured to operably demodulate the plural filtered modulation signals and generate corresponding demodulation signals respectively, wherein each of the filtered modulation signals corresponds to at least one of the demodulators, and each of the demodulation signals includes one or more unit signals; and
   a determination circuit, which is configured to operably receive the plural demodulation signals, and determine whether each unit signal of each of the demodulation signals is correct or not according to a determination mechanism, and combine one or more correct unit signals to generate the output signal.

2. The communication signal demodulation apparatus of claim 1, wherein the unit signal comprises a packet or a byte.

3. The communication signal demodulation apparatus of claim 1, wherein the communication signal is transmitted to the communication signal demodulation apparatus via a wireless communication transmission method.

4. The communication signal demodulation apparatus of claim 1, wherein the plural demodulators demodulate the plural filtered modulation signals by different demodulation processes, respectively.

5. The communication signal demodulation apparatus of claim 4, wherein the demodulation processes employed by the demodulators to demodulate the filtered modulation signals comprises:

calculating pulse widths between two neighboring level changes of the filtered modulation signals by edge detection; and demodulating the filtered modulation signals according to the pulse widths between the neighboring level changes of the filtered modulation signals and a logic level of each pulse width.

6. The communication signal demodulation apparatus of claim 4, wherein the demodulation processes employed by the demodulators to demodulate the filtered modulation signals comprises:

calculating pulse widths between two neighboring level changes of the filtered modulation signals by a clock signal; and demodulating the filtered modulation signals according to the pulse widths between the neighboring level changes of the filtered modulation signals and a logic level of each pulse width.

7. The communication signal demodulation apparatus of claim 1, wherein the determination mechanism comprises a checksum step and/or a parity check step.

8. A communication signal demodulation method for demodulating a communication signal to generate an output signal, the communication signal demodulation method comprising:

sensing different electrical characteristics of one same communication signal and generating corresponding sensing modulation signals respectively by a plurality of sensor circuits;

filtering the plural sensing modulation signals respectively and generating corresponding filtered modulation signals respectively;

demodulating the filtered modulation signals by one or more demodulation processes to generate corresponding demodulation signals, wherein each of the filtered modulation signals corresponds to at least one of the demodulation processes, and each of the demodulation signals includes one or more unit signals; and receiving the demodulation signals, and determining whether each unit signal of each of the demodulation signals is correct or not according to a determination mechanism, and combining one or more correct unit signals to generate the output signal.

9. The communication signal demodulation method of claim 8, wherein the unit signal comprises a packet or a byte.

10. The communication signal demodulation method of claim 8, wherein the communication signal is generated via a wireless communication transmission method.

11. The communication signal demodulation method of claim 8, wherein each of the filtered modulation signals corresponds to a plurality of the demodulation processes.

12. The communication signal demodulation method of claim 8, wherein the demodulation process employed to demodulate the filtered modulation signals comprises:

calculating pulse widths between two neighboring level changes of the filtered modulation signals by edge detection; and demodulating the filtered modulation signals according to the pulse widths between the neighboring level changes of the filtered modulation signals and a logic level of each pulse width.

13. The communication signal demodulation method of claim 8, wherein the demodulation processes employed to demodulate the filtered modulation signals comprises:

calculating pulse widths between two neighboring level changes of the filtered modulation signals by a clock signal; and demodulating the filtered modulation signals according to the pulse widths between the neighboring level changes of the filtered modulation signals and a logic level of each pulse width.

14. The communication signal demodulation method of claim 8, wherein the determination mechanism comprises a checksum step and/or a parity check step.

* * * * *